(12) United States Patent
Nakayama

(10) Patent No.: US 8,640,473 B2
(45) Date of Patent: Feb. 4, 2014

(54) REFRIGERATION APPARATUS AND METHOD FOR CONTROLLING THE SAME

(75) Inventor: Junya Nakayama, Kawaguchi (JP)

(73) Assignee: Nakayama Engineering Company Limited, Kawaguchi (JP)

( * ) Notice: Subject to any disclaimer, the term of this patent is extended or adjusted under 35 U.S.C. 154(b) by 239 days.

(21) Appl. No.: 12/910,355

(22) Filed: Oct. 22, 2010

(65) Prior Publication Data

US 2011/0035062 A1 Feb. 10, 2011

Related U.S. Application Data

(63) Continuation of application No. 11/319,698, filed on Dec. 29, 2005, now Pat. No. 7,841,195.

(30) Foreign Application Priority Data

Dec. 30, 2004 (JP) ................................. 2004-382995

(51) Int. Cl.
*F25B 39/04* (2006.01)
*F25D 17/00* (2006.01)

(52) U.S. Cl.
USPC .................................. 62/183; 62/181; 62/210

(58) Field of Classification Search
USPC ......... 62/208, 209, 213, 228.3, 181, 183, 210
See application file for complete search history.

(56) References Cited

U.S. PATENT DOCUMENTS

| | | | |
|---|---|---|---|
| 3,744,269 A * | 7/1973 | Oshima et al. ................... | 62/212 |
| 4,193,781 A * | 3/1980 | Vogel et al. ........................ | 62/81 |
| 5,168,715 A * | 12/1992 | Nakao et al. ..................... | 62/181 |
| 5,647,457 A | 7/1997 | Wegdam et al. | |
| 5,735,134 A * | 4/1998 | Liu et al. .......................... | 62/230 |
| 6,170,277 B1 * | 1/2001 | Porter et al. .................. | 62/228.3 |
| 6,272,870 B1 | 8/2001 | Schaeffer | |
| 6,499,308 B2 | 12/2002 | Inoue et al. | |
| 6,671,818 B1 * | 12/2003 | Mikurak ...................... | 714/4.21 |
| 7,237,395 B2 | 7/2007 | Rafalovich et al. | |
| 2002/0121100 A1 | 9/2002 | Yabuki et al. | |
| 2004/0187504 A1 | 9/2004 | Healy et al. | |
| 2005/0072170 A1 | 4/2005 | Taniguchi et al. | |
| 2007/0051119 A1 | 3/2007 | Hayashi et al. | |

FOREIGN PATENT DOCUMENTS

| | | | |
|---|---|---|---|
| DE | 2451361 A1 | 5/1976 |
| EP | 0419857 A2 | 4/1991 |
| EP | 0786632 A2 | 7/1997 |
| EP | 1162419 A1 | 12/2001 |

(Continued)

OTHER PUBLICATIONS

"Energy-Saving Freezer and Refrigeration Equipment without Condensation Pressure Control" Refrigeration and Air Conditioning Equipment, vol. 25, No. 6, pp. 17-25. Jun. 1998.

(Continued)

*Primary Examiner* — Cassey D Bauer
(74) *Attorney, Agent, or Firm* — Ditthavong Mori & Steiner, P.C.

(57) ABSTRACT

A refrigeration apparatus includes a condensing unit, a flow distributor, and an evaporator connected to the condensing unit via the flow distributor. A pressure detector is configured to detect condensation pressure of the refrigerant. A calculation unit is configured to calculate a target condensation pressure of refrigerant necessary for the refrigerant to be an evaporation temperature in the evaporator. A controller is configured to control the condensing unit so that the condensation pressure of the refrigerant becomes equal to or more than the target condensation pressure.

22 Claims, 5 Drawing Sheets

(56) References Cited

FOREIGN PATENT DOCUMENTS

| EP | 1207361 | A2 | 5/2002 |
|---|---|---|---|
| EP | 1213549 | A1 | 6/2002 |
| EP | 1241417 | A1 | 9/2002 |
| EP | 1275917 | A2 | 1/2003 |
| EP | 1442906 | A2 | 8/2004 |
| EP | 1467158 | A2 | 10/2004 |
| JP | 60-191869 | U | 12/1985 |
| JP | 02-082074 | | 3/1990 |
| JP | 06-171352 | | 6/1994 |
| JP | 2001-108313 | | 4/2001 |
| JP | 2001-116396 | | 4/2001 |
| JP | 2001-194017 | A | 7/2001 |
| JP | 2002-071255 | | 3/2002 |
| JP | 2003-237360 | | 8/2003 |
| JP | 2004-340470 | A | 12/2004 |
| WO | WO 03019085 | A1 | 3/2003 |

OTHER PUBLICATIONS

Althouse A D et al: "Modern Refrigeration and Air Conditioning" Modern Refrigeration and Air Conditioning, 2000, XP002507387, p. 476.

Japanese Office Action for corresponding JP Application No. 2004-382995, Dec. 17, 2007.

Japanese Decision of Final Rejection for corresponding JP Application No. 2004-382995, Aug. 29, 2008.

* cited by examiner

REFRIGERATION APPARATUS AND METHOD FOR CONTROLLING THE SAME

CROSS-REFERENCE TO RELATED APPLICATIONS

The present application is a continuation application of the U.S. patent application Ser. No. 11/319,698 filed Dec. 29, 2005, which claims priority under 35 U.S.C. §119 to Japanese Patent Application No. 2004-382995, filed Dec. 30, 2004. The contents of these applications are incorporated herein by reference in their entirety.

BACKGROUND OF THE INVENTION

1. Field of the Invention

The present invention relates to a refrigeration apparatus, a method for controlling a refrigeration apparatus, and a computer readable media for controlling a computer.

2. Discussion of the Background

Generally, a refrigeration apparatus is provided with a condensation pressure adjustment valve, a fan controller and the like in a condenser of the refrigeration apparatus. The condensation temperature is controlled around 30° C. at the lowest limit, irrespective of the evaporation temperature of the refrigerant in or the outside temperature of the unit cooler. In this respect, the present inventor has demonstrated that a higher efficiency and significant power savings can be achieved by operating the refrigeration apparatus without controlling the condensation pressure all year around. See "*Energy-Saving Freezer and Refrigeration Equipment without Condensation Pressure Control*" Refrigeration and Air Conditioning Equipment, Vol. 25, No. 6, pp. 17-25. June 1998. The contents of this reference are incorporated by reference in their entirety.

According to this reference, it is possible to operate the refrigeration apparatus at a very small pressure differential by allowing the condensation temperature to follow the course of outside temperatures without controlling it around 30° C., and by selecting a flow distributor based on the freezer performance and the refrigerant temperature under a low condensation pressure.

More specifically, this involves the selection of nozzle diameter, tube diameter and tube length which will not allow the pressure drop in the nozzles and tubes of the distributor to fall below 70 kPa under the minimum condition for uniform refrigerant distribution in the unit cooler. As a result of this, refrigerant liquid will be uniformly distributed to the various circuits in the unit cooler. By employing this special design and operation approach, it is proven that the operation becomes possible at a very small difference of 300 kPa between the evaporation pressure and the condensation pressure of refrigerant.

SUMMARY OF THE INVENTION

According to one aspect of the present invention, a refrigeration apparatus includes a condensing unit, a flow distributor, and an evaporator connected to the condensing unit via the flow distributor. A pressure detector is configured to detect condensation pressure of the refrigerant. A calculation unit is configured to calculate a target condensation pressure of refrigerant necessary for the refrigerant to be an evaporation temperature in the evaporator. A controller is configured to control the condensing unit so that the condensation pressure of the refrigerant becomes equal to or more than the target condensation pressure.

According to another aspect of the present invention, a method for controlling a refrigeration apparatus includes detecting condensation pressure of refrigerant, calculating a target condensation pressure of the refrigerant necessary for the refrigerant to be an evaporation temperature in the evaporator, and controlling a condensing unit connected to the evaporator via a flow distributor so that the condensation pressure of the refrigerant becomes equal to or more than the target condensation pressure.

According to yet another aspect of the present invention, a computer readable media for controlling a computer to perform the steps of detecting condensation pressure of refrigerant; calculating a target condensation pressure of the refrigerant necessary for the refrigerant to be an evaporation temperature in the evaporator; and controlling a condensing unit connected to the evaporator via a flow distributor so that the condensation pressure of the refrigerant becomes equal to or more than the target condensation pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
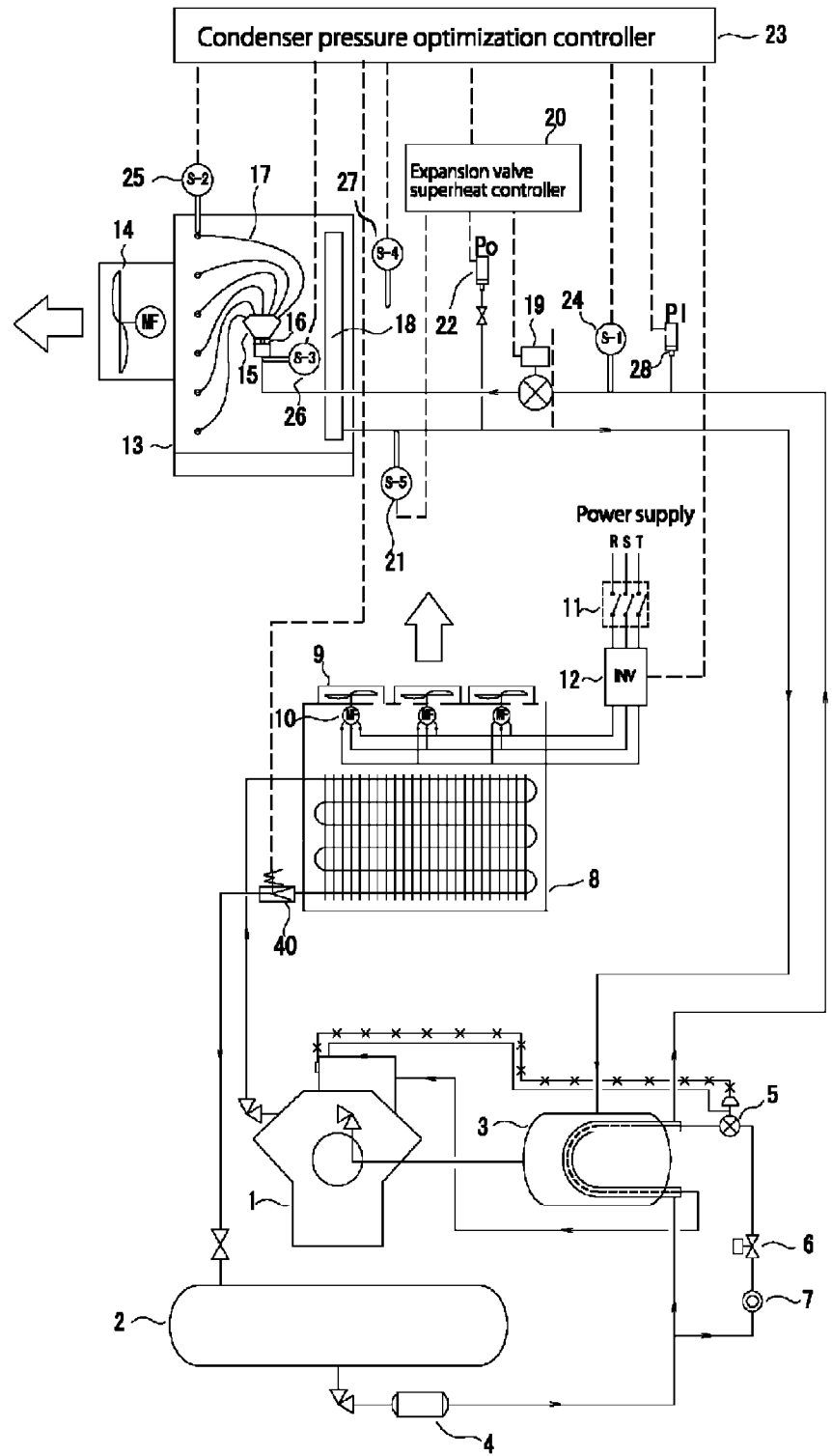
FIG. 1 is a schematic diagram of a refrigeration apparatus according to an embodiment of the present invention.

The embodiments will now be described with reference to the accompanying drawings, wherein like reference numerals designate corresponding or identical elements throughout the various drawings.

The apparatus disclosed in the "*Energy-Saving Freezer and Refrigeration Equipment without Condensation Pressure Control*" does not consider the temperature rise due to the load generated by stored products in the actual operation of unit cooler. For walk-in freezers, no consideration is given to the dryness of refrigerant, $\chi$, which is induced by an increase in freezing performance or rise in the refrigerant liquid temperature, because the evaporation temperature goes up as the room temperature rises upon the completion of defrosting in actual operation. Thus, applying the background art as it is to refrigeration apparatus operated under diverse conditions or allowing the condensation pressure to decrease following the outside air conditions may lead to an operation failure due to the following problems.

Refrigeration equipment using R-22 as the refrigerant and a two-stage compression freezing cycle at a displacement volume ratio of 2:1 between low and high stages is hereby used as an example. The normal pressure is expressed as the absolute pressure, abs. Under an outside temperature of −10° C., the condensation temperature of the refrigerant was at tk=−7° C. (converted to an equivalent pressure of 395 kPa (abs), which is applicable to the subsequent items); the room temperature of the refrigerator at −35° C.; the evaporation temperature of refrigerant at t0=−41° C. (100 kPa); and the liquid temperature t1=−25° C., the pressure drop in the flow distributor to the unit cooler was made 79 kPa by selecting appropriate nozzles and tubes.

The condensation pressure of refrigerant 395 kPa (abs) − pressure loss in the liquid pipe: 26 kPa − pressure drop in the expansion valve: 190 kPa − pressure drop in the flow distributor: 79 kPa = evaporation pressure: 100 kPa

As shown, at a freezer capacity $\Phi o=15$ kW, the condensation pressure had an appropriate value necessary for the amount of pressure drop.

Under this operating condition, assuming that goods are brought into the freezer room and that the thermal load from this causes the room temperature to rise to −23° C., the evaporation temperature of refrigerant would be t0=−12° C. (an equivalent pressure of 164 kPa (abs)); freezer capacity, $\Phi o=23$ kW; and the refrigerant liquid temperature, T1=−12° C. Thus dryness $\chi$ and freezer capacity $\Phi o$ are increased. The pressure drop in the flow distributor, on the other hand, almost doubles to 150 kPa, with the pressure loss in the liquid piping at 48 kPa and the pressure drop in the expansion valve at 265 kPa.

At this point, the sum of gross pressure loss and pressure drops is as follows:

pressure loss in the refrigerant liquid piping 48 kPa + pressure drop in the expansion valve: 265 kPa + pressure drop in the flow distributor 150 kPa = 463 kPa.

When the evaporation pressure of 164 kPa (abs), the ultimate value after such pressure drops, is added to the above, the total becomes 627 kPa, that is, the necessary condensation pressure. When converted to an equivalent temperature, this is +6.6° C., the limit for the condensation pressure.

On the other hand, since the outside temperature is set at −10° C. as above, if the condensation pressure is allowed to follow the outside temperature, then the condensation temperature will drop down to about −7° C. As a result, the pressure drop necessary for refrigerant to reach the evaporation pressure will not be attained; and even if the expansion valve is fully opened, the refrigerant in the refrigerant side coil of the unit cooler will end up overheated. This leads to an abnormal operating condition where the apparent freezing capacity of the unit cooler decreases, and the difference between the room temperature and the evaporation temperature of refrigerant, TD, reaches 18° C. If, in this condition, the evaporation temperature of the refrigerant is −41° C., the freezing capacity is 15 kW, and the freezing capacity is larger than the thermal load of the storage room, then the temperature will eventually reach −35° C. as initially set. Freezers, on the other hand, have higher thermal loads and are susceptible to superheat when the thermal load is larger than the freezing capacity, resulting in inadequate cooling. It is therefore necessary to obtain a pressure drop large enough to produce the appropriate evaporation pressure based on the room temperature; the above-mentioned 627 kPa (abs) (equivalent temperature of +6.6° C.) thus represents the value of condensation pressure required for normal operation.

If the compression side of the refrigeration equipment circuit, i.e., the condensation pressure, decreases below the above-mentioned total pressure value, which is the sum of the pressure losses and pressure drops with the evaporation pressure as the other endpoint, then the operation proposed here becomes impossible for the refrigeration cycle that uses a pressure difference for circulation. Since equilibrium is reached at a low evaporation temperature, insufficient refrigeration performance and inadequate cooling will occur.

In addition, when the unit cooler is restarted at a high temperature after defrosting, the evaporation temperature will be −20° C., even when the MOP (Maximum Operating Pressure) function is deployed; and the necessary amount of pressure drop will temporarily reach approximately 760 kPa due to increased freezing performance and higher refrigerant liquid temperature. For refrigerant distributors constructed with fixed nozzles and tubes without any mechanism to control the rate of refrigerant flow, changes in the mass flow and the dryness $\chi$ of refrigerant will lead to large variations in the pressure drop.

For refrigeration apparatus designed with the temperature differential between evaporation and condensation as its operating principle and 300 kPa as the minimum necessary condition for refrigerant distribution to take place, the amount of pressure drop necessary to attain the evaporation temperature increases as the mass flow of refrigerant and/or the liquid temperature increases. When allowed to follow the course of outside temperature, on the other hand, the operating condition typically presents a pressure drop below the required level. This makes it necessary to maintain the condensation pressure above the amount of pressure drop required to reach the evaporation temperature, and if it falls below the pressure drop value, then an equilibrium will be reached with the evaporation temperature differential at a very low point, causing the freezing performance of the refrigeration apparatus to deteriorate. This renders the freezer capacity extremely insufficient for the load, causing poor cooling, and even an operation failure.

Refrigeration equipment using R-404A (Dew Point Formula) as the refrigerant and a two-stage compression freezing cycle at a displacement volume ratio of 2.5:1 between low and high stages is hereby used as another example. Under an outside temperature of −15° C., the condensation temperature of the refrigerant at tk=−10° C. (equivalent to 440 kPa (abs)), the room temperature of the refrigerator at −69° C., the evaporation temperature of refrigerant at t0=−71° C. (100 kPa), and the liquid temperature t1=−48° C., the required pressure drop in the flow distributor upstream to the unit cooler is 66 kPa. At the same time, the pressure drop in the expansion valve is 260 kPa, pressure loss in the liquid piping is 30 kPa, and the freezing capacity is $\Phi o=14$ kW. Under this operating condition, the door of the refrigeration apparatus was opened to exchange the frozen goods with fresh unfrozen goods. As a result, the temperature of the refrigeration apparatus rose to −40° C., and the increased freezing performance resulted in a 5° C. difference TD between the evaporation temperature of the refrigerant in the unit cooler and the room temperature; the evaporation temperature rose to −45° C., and the freezing capacity increased to $\Phi o=40$ kW.

The appropriate amount of pressure drop to attain the evaporation temperature under these conditions is as follows:

pressure loss in the liquid pipe: 67 kPa + pressure drop in the expansion valve: 220 kPa + pressure drop in the flow distributor: 250 kPa = 537 kPa

When the evaporation pressure of 109 kPa (abs), which is the end point of the pressure drop, is added to this, the required pressure is 646 kPa (abs). In terms of equivalent temperature, this represents +2° C., which is the limit value for condensation pressure. If the condensation pressure is allowed to decrease following the outside temperature, it will fall below the amount of pressure drop necessary to attain the evaporation temperature, resulting in the lowering of the evaporation pressure. As a result, only an extremely small freezing capacity is generated in relation to the thermal load, causing inadequate cooling. It is therefore necessary to maintain the condensation pressure above the required pressure drop. Even if the outside temperature is at −15° C., it is necessary to limit the condensation pressure at 646 kPa (abs) (the equivalent temperature of about +2° C.) so that the system operates at the evaporation temperature of refrigerant t0=−45° C.

FIG. 1 shows a schematic diagram of a refrigeration apparatus according to an embodiment of the present invention. In this refrigeration apparatus, the temperature of liquid refrigerant is controlled according to different evaporation temperatures. Referring to FIG. 1, a unit cooler 13 has a fan 14, a fin coil (not shown), a flow distributor 15, and a suction head 18 for collecting pipes. The distributor 15 is connected to each circuit in the fin coil through nozzle 16 and tube 17. The condensation pressure optimization controller 23 has, on the other hand, a liquid temperature sensor 24, an evaporation temperature sensor 25, a refrigerant temperature sensor 26, a temperature sensor 27 on the air inlet side of the unit cooler 13, a pressure sensor 28, and an inverter 12. The liquid temperature sensor 24 is for measuring the refrigerant temperature on the upstream side of the expansion valve 19. The refrigerant temperature sensor 26 is for measuring the refrigerant temperature at the inlet port of the distributor 15. The pressure sensor 28 is for measuring the refrigerant pressure on the upstream side of the expansion valve 19. The expansion valve's superheat controller 20 is connected to the expansion valve 19. The superheat controller 20 is connected respectively to a temperature sensor 21 that measures the refrigerant gas temperature in the refrigerant suction pipe and a pressure sensor 22 for the expansion valve that measures the saturation pressure. The expansion valve's superheat controller 20 regulates the refrigerant flow rate of the expansion valve by determining the degree of superheat from the pressure-equivalent temperature and the actual measurement of the temperature sensor 21.

The air-cooled condenser 8, on the other hand, is equipped with a fan 9 that is driven by a motor 10, which is in turn powered by the output from the inverter 12. This inverter 12 is provided with power through an electromagnetic switch 11 from a power source. The air condenser 8 has its liquefied refrigerant outlet side connected to a refrigerant liquid receiver 2 through a valve, while the refrigerant liquid receiver 2 has its refrigerant outlet side connected to an intermediate cooler 3 via a dryer 4. One of the refrigerant outlet ports of this intermediate cooler 3 is connected to the expansion valve 19 after over-cooling, while the outlet port to the high stage suction of the two-stage compression freezer unit 1. The intermediate cooler 3 is connected to the expansion valve 5 for the intermediate cooler, a solenoid valve 6, and sight glass 7.

Figure 4:
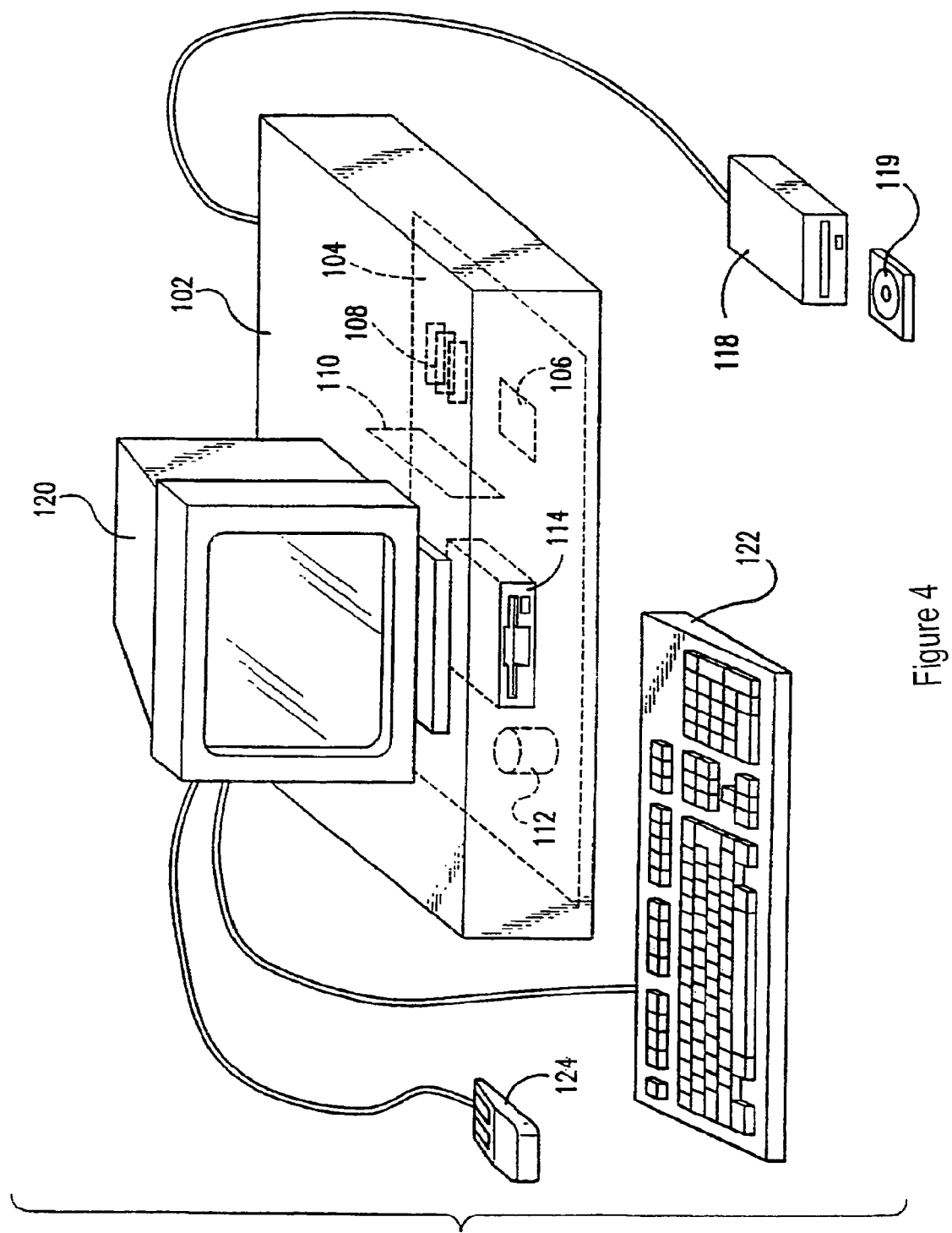
FIG. 4 is a schematic illustration of the condenser pressure optimization controller.

FIG. 4 is a schematic illustration of the controller 23. In this embodiment, the controller 23 is, for example, a computer system. The computer system 23 implements the method of the present embodiment according to the invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer system 23 also includes plural input devices, (e.g., a keyboard 122 and mouse 124), and a display card 110 for controlling monitor 120. In addition, the computer system 23 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer system 23 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 23 and for enabling the computer 23 to interact with a human user. Such software may include, but is not limited to, device drivers, operating systems and user applications, such as development tools. Such computer readable media further includes the computer program product of the present embodiment according to the invention for detecting condensation pressure of refrigerant; calculating a target condensation pressure of the refrigerant necessary for the refrigerant to be an evaporation temperature in the evaporator; and controlling a condensing unit connected to the evaporator via a flow distributor so that the condensation pressure of the refrigerant becomes equal to or more than the target condensation pressure.

The computer code devices of the present invention can be any interpreted or executable code mechanism, including but not limited to scripts, interpreters, dynamic link libraries, Java classes, and complete executable programs.

If the optimization control of condensation pressure is based on an amount of pressure drop required for producing the evaporation temperature as shown in this embodiment, it is necessary to select a proper distributor 15 for the unit cooler 13 in order to provide a specified performance. For the selection of a distributor, the liquid refrigerant temperature at the inlet of the expansion valve 19 has to be estimated. When a two-stage compression freezer unit is used, as in FIG. 1, the unit manufacturer is supposed to disclose the liquid refrigerant temperature at the inlet port of the expansion valve 19, but the information is often missing in the manufacturer's catalogues or information package. In addition, the condensation temperatures that manufacturers publish are restricted to 45° C.-25° C. It means that the estimation of the liquid temperature at the inlet of the expansion valve 19 is needed, based on the evaporation and condensation temperatures, if the aim is to efficiently operate the system by lowering the condensation temperature down to approximately −15° C.

For instance, the liquid temperature tm of the refrigerant at the inlet of expansion valve 19 is calculated using the following equation:

Equation 1

$$tm = \frac{-120}{to} + 0.275\ tk + 8.5\frac{V_L}{V_H} + \frac{\left(\frac{V_L}{V_H}+8\right)}{10} \cdot (to+30) \times (1.03 - 0.0025\ tk) - 0.15 \cdot \left(0.5 - \frac{1}{\frac{V_L}{V_H}}\right) \cdot (tk-10) - 31.75 \quad (1)$$

Where:
tm=Intermediate Temperature (° C.);
to=Evaporation Temperature (° C.);
tk=Condensation Temperature (° C.);
VL=Displacement volume of the low stage compressor (m3/h); and,
VH=Displacement volume of the high stage compressor ((m3/h).

The condensation temperature, tk, is the temperature of the refrigerant undergoing condensation by the cooling medium.

Equation 1 is the practical equation applicable to when the refrigerant R-22 is used. Other suitable refrigerants can be described with this equation by modifying the coefficient of the specific heat ratio when their respective thermal-physical properties are known. Single-stage compressors can be designed based on the equation by accounting for over-cooling at a certain constant ratio from the condensation temperature of the refrigerant. Distributor 15 can be selected by calculating the liquid temperature of the refrigerant.

A specific example of a selection process is shown here. Table 1 below shows an example in which a refrigerator has a two-stage compression freezer cycle using R-22 as its refrigerant with a displacement ratio of 2:1 between high and low stages.

TABLE 1

|  | Winter Season | Summer Season |
| --- | --- | --- |
| Outside Air Temperature | −10° C. | +25° C. |
| Condensation Temperature (tk) | −7° C. | +30° C. |
| Evaporation Temperature (to) | −41° C. | −40.2° C. |
| Liquid Temperature of Refrigerant (tl) | −25° C. | −10° C. |
| Number of Circuits in the Tubing | 20 | 20 |
| Inner Diameter of Tubing (mm) | 3.25 mm | 3.25 mm |
| Length of Tubing (mm) | 800 mm | 800 mm |
| Nozzle Diameter (mm) | 4.16 mm | 4.16 mm |
| Freezing Capacity (kW) φo | 15 kW | 12 kW |
| Pressure Drop in the Nozzle | 56 kPa | 108 kPa |
| Pressure Drop in the Tubing | 23 kPa | 31 kPa |
| Total Pressure Drop | 79 kPa | 139 kPa |

In winter, for instance, under the selection criteria of an outside temperature at −10° C., refrigerant condensation temperature of −7° C., refrigerant evaporation temperature at −41° C., liquid refrigerant temperature at −25° C., the number of circuits in tubing at 20, the inner diameter of tubing at 3.25 mm, tubing length at 800 mm, freezing capacity at 15 kW, and nozzle diameter at 4.16 mm.

Pressure drop in nozzle 16 . . . 56 kPa
Pressure drop in tubing 17 . . . 23 kPa
Total pressure drop . . . 79 kPa In this example, the total pressure drop in nozzle 16 and tubing 17 is 79 kPa when the condensation temperature tk=−7° C., which is within the distribution range. In addition, the condensation temperature required to set the liquid refrigerant temperature at −25° C. is −7° C., the pressure drop required for evaporation temperature is 390 kPa (abs), a total of the pressure loss in the liquid piping between the outlet of the refrigerant receiver 2 to the expansion valve 19, the pressure drop in the expansion valve, and pressure drops in the distributor nozzle 16 and tubing 17. As shown in the right-hand column of Table 1, in summertime when the condensation temperature is higher, the distributor 15 is subjected to a pressure drop of 139 kPa. Yet the condensation temperature is at +30° C., or 1192 kPa (abs) in equivalent pressure, causing no problems in the summer operation even if the distributor is selected in accordance with the minimum criteria for the season, when the liquid refrigerant temperature is low.

Table 2 below shows the conditions of the same refrigeration apparatus when the temperature in the refrigeration room rises, due to restocking, for example, and the evaporation temperature of the refrigerant also rises.

TABLE 2

|  | Winter Season | Summer Season |
| --- | --- | --- |
| Outside Air Temperature | −10° C. | +25° C. |
| Condensation Temperature (tk) | −6° C. | +30° C. |
| Evaporation Temperature (to) | −30° C. | −28.9 |
| Liquid Temperature of Refrigerant (tl) | −12° C. | +3° C. |
| Number of Circuits in the Tubing | 20 | 20 |
| Inner Diameter of Tubing (mm) | 3.25 mm | 3.25 mm |
| Length of Tubing (mm) | 800 mm | 800 mm |
| Nozzle Diameter (mm) | 4.16 mm | 4.16 mm |
| Freezing Capacity (kW) φo | 23 kW | 19 kW |
| Pressure Drop in the Nozzle | 108 kPa | 190 kPa |
| Pressure Drop in the Tubing | 42 kPa | 57 kPa |
| Total Pressure Drop | 150 kPa | 247 kPa |

Table 2 shows that there will be a pressure drop of 150 kPa in total between nozzle 16 and tubing 17 of the distributor 15 in winter. When the freezing capacity increases due to a higher evaporation temperature of the refrigerant, the required pressure drop for the evaporation temperature in this example will be approximately 600 kPa, a total of the pressure drops in nozzle 16, tubing 17 and expansion valve 19, and the pressure loss in the liquid piping.

Table 3 shows the condition in which the unit cooler 13 loses performance due to frost formation.

TABLE 3

| Outside Air Temperature | −10° C. |
| --- | --- |
| Condensation Temperature (tk) | +10° C. |
| Evaporation Temperature (to) | −45° C. |
| Liquid Temperature of Refrigerant (tl) | −20° C. |
| Number of Circuits in the Tubing | 20 |
| Inner Diameter of Tubing (mm) | 3.25 mm |
| Length of Tubing (mm) | 800 mm |
| Nozzle Diameter (mm) | 4.16 mm |
| Freezing Capacity (kW) φo | 12 kW |
| Pressure Drop in the Nozzle | 64 kPa |
| Pressure Drop in the Tubing | 25 kPa |
| Total Pressure Drop | 89 kPa |

Figure 2:
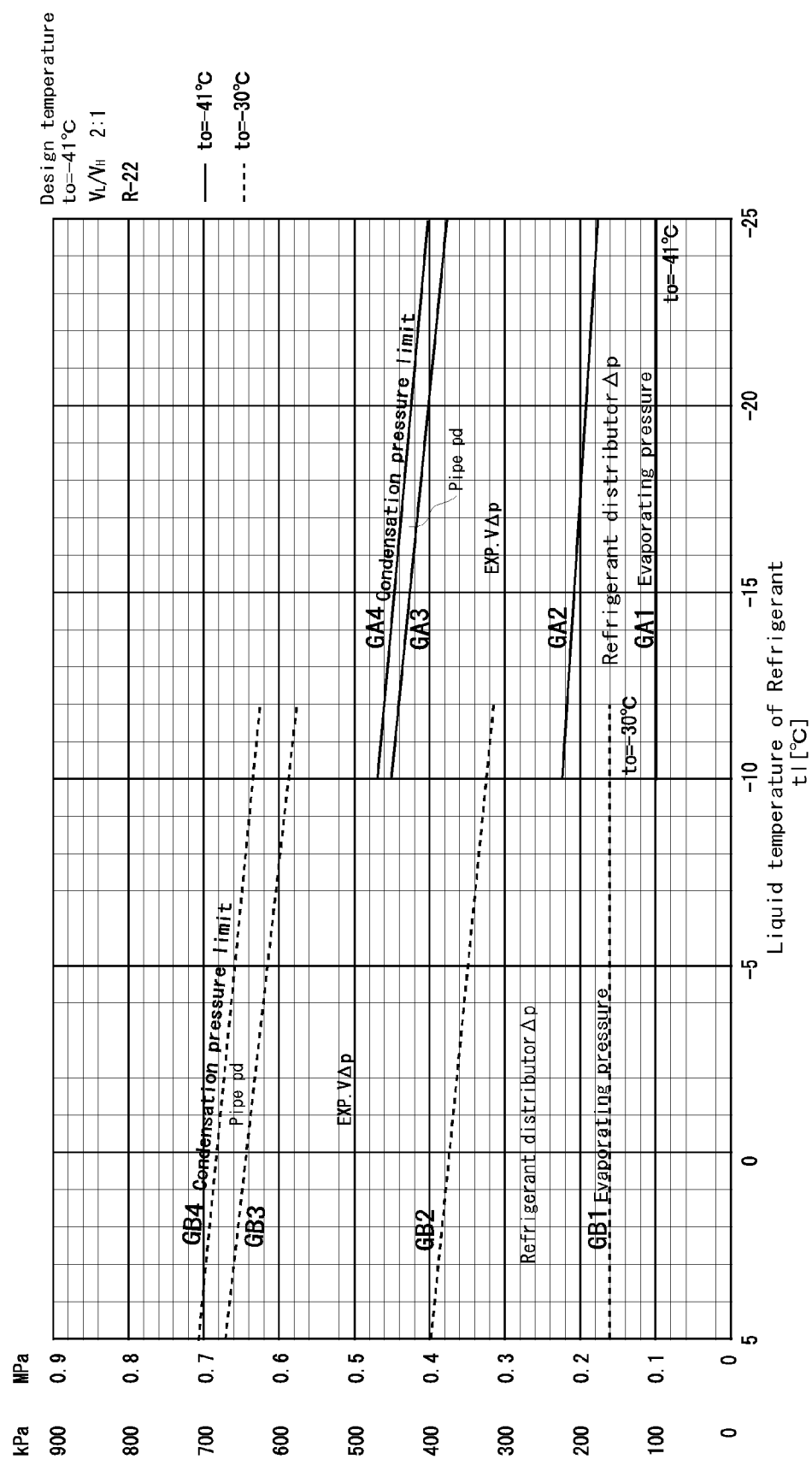
FIG. 2 is a drawing showing the relationship between the evaporation temperature of the refrigerant and the amount of pressure drop obtained from the liquid temperature of the refrigerant (R-22)

Normal operation can be maintained by raising the condensation temperature to +10° C. and obtaining 89 kPa as the total pressure drop in nozzle 16 and tubing 17. In addition, the timing for the defrosting function can be automatically determined by monitoring operating conditions. FIG. 2 shows the relationship between the evaporation temperature and the liquid refrigerant temperature. In FIG. 2, the x axis represents tl, the liquid refrigerant temperature (the temperature at the inlet of expansion valve 19), while the y axis represents the pressure. The solid lines represent the pressure drop under the refrigerant evaporation temperature to −41° C.; the dotted lines, the same to −30° C. Solid line GA1 and dotted line GB1 show the evaporation temperature of the refrigerant and also the endpoints of the pressure drops. Solid line GA2 and dotted line GB2 represent the initial pressure at distributor 15 before a pressure drop; solid line GA3 and dotted line GB3 represent the endpoint of pressure loss in the liquid refrigerant piping; and solid line GA4 and dotted line GB4 represent the condensation pressure limit, which is the aggregate of the pressure drop in expansion valve 19, pressure losses in liquid feeder piping and dryer 4, and the pressure drop in distributor 15. Pipe pd shown in the figure shows the pressure loss in the liquid refrigerant piping, while EXP.VΔp shows the pressure drop in the expansion valve.

In this figure, the intersection of the solid line representing the refrigerant evaporation temperature at −41° C. and GA4, the line representing the liquid refrigerant temperature of −25° C., represents 395 kPa (abs) (condensation temperature tk=−7° C.) in pressure on the vertical axis. Since the pressure drop is not sufficient if the condensation temperature goes any lower, this point is taken as the limit value for condensation pressure. As another example, the intersection of dotted line GB1 representing the refrigerant evaporation temperature to −30° C. and GB4, the dotted line representing the liquid refrigerant temperature of −12° C., represents 627 kPa (abs) in pressure on the vertical axis. In other words, the equivalent temperature of +6.6° C. is the limit value for condensation pressure. Thus the pressure drop is mathematically mapped on the two variables, evaporation temperature (to) and liquid temperature (tl) of the refrigerant, and an arbitrary constant for variations in freezing capacity to be generated by the capacity control of the freezing unit is expressed in an equation. The map derived from the polynomial equation or its regression formula is then installed in the processor so that the condensation pressure optimization controller 23 can control and optimize the condensation temperature of the refrigerant in the freezing unit.

Table 4 (see page 14) is an example of the map. This map is, for example, stored in the memory 108 of the controller 23. Actual measurements are compared to these calculations so that the condensation performance is adjusted to approximate the values given.

Table 4 shows a target condensation pressure (kPa) of the refrigerant immediately upstream of the expansion valve 19. The target condensation pressure is for the refrigerant to be an evaporation temperature in the evaporator. The target condensation pressure is calculated from the following equation:

$$\text{Target Pressure} = 1125.08 + (9.07965 \cdot X) + (-0.101693 \cdot X \cdot X) + (40.8041 \cdot Y) + (1.60973 \cdot X \cdot Y) + (0.0177658 \cdot X \cdot X \cdot Y) + (-0.0547654 \cdot Y \cdot Y) + (0.00318583 \cdot X \cdot Y \cdot Y) + (-0.000044704 \cdot X \cdot X \cdot Y \cdot Y),$$

where X=Evaporation Temperature, and Y=Liquid Temperature of Refrigerant

Figure 3:
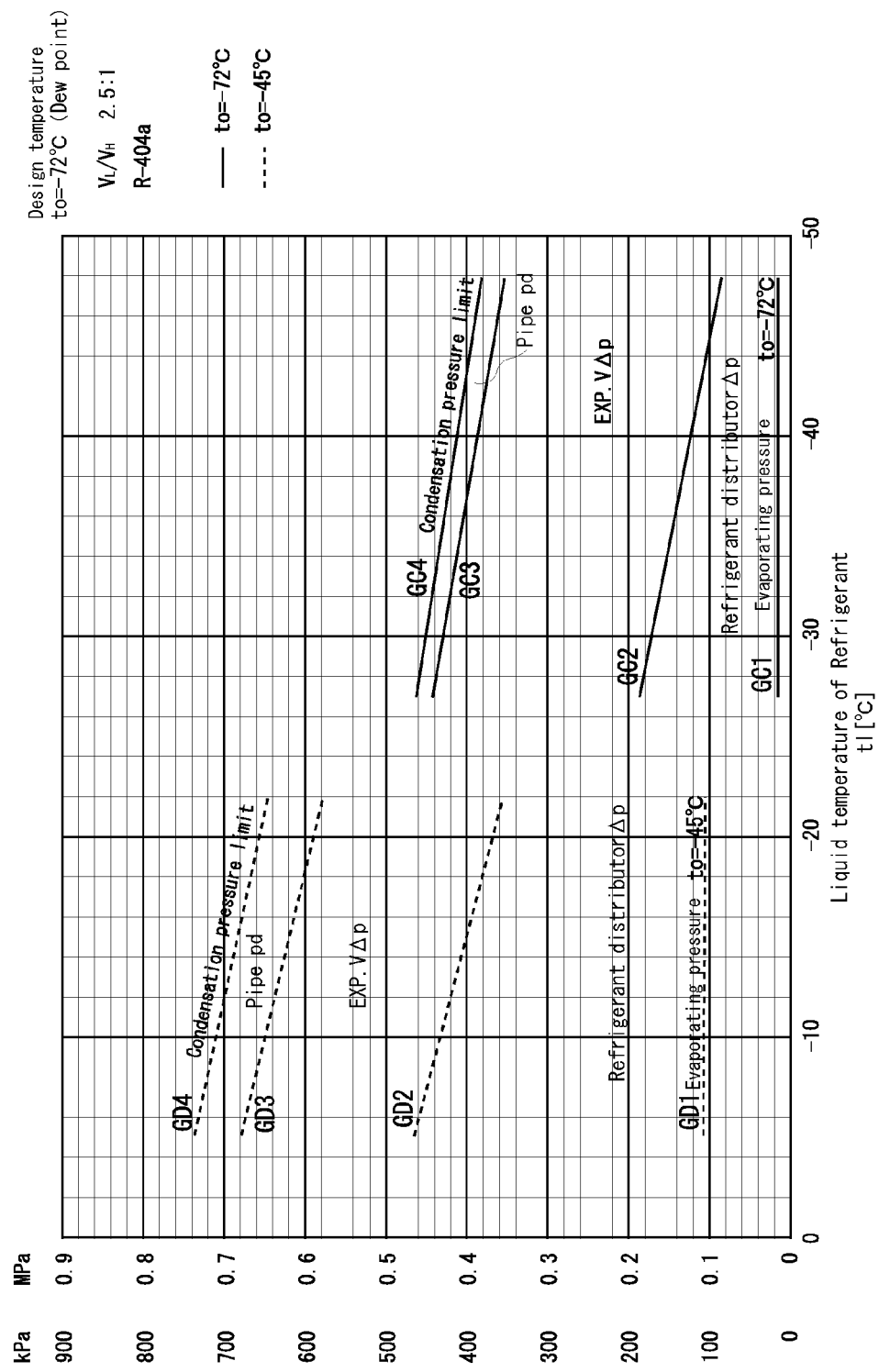
FIG. 3 is a drawing showing the relationship between the evaporation temperature of the refrigerant and the amount of pressure drop obtained from the liquid temperature of the refrigerant (R-404a)

FIG. 3 is the standard chart of minimum values at which distribution is possible for the refrigerant R-404a (dew point method) in a two-stage compression freezing cycle, for which the displacement ratio between low and high stages is 2.5:1; the evaporation temperature of the refrigerant, −72° C.; and the liquid temperature, −48° C. when the condensation temperature is −10° C. The solid lines GC1 to GC4 and the dotted lines GD1~GD4 correspond respectively to the solid lines GA1 to GA4 and the dotted lines GB1~GB4 of FIG. 2.

As an approach for condensation pressure control, it is certainly possible to obtain the required pressure drop from the measured values of refrigerant evaporation temperature and pressure drop in the distributor 15. The use of pressure sensors is one way to measure such pressure drops, but measuring accurate liquid refrigerant temperatures by the use of refrigerant temperature sensor 26 immediately before distributor 15 and at the outlet of tubing 17 of distributor 15 and converting them to equivalent pressures is by far more accurate and cheaper. It is possible to express a sum of prescribed pressure drops and pressure losses as well as the pressure drop of the distributor 15 in a numerical equation, and to actively lower the refrigerant pressure to the lower limit of condensation pressure for operation. Such measurements are, however, affected by the variable opening of expansion valve, which in turn affects the control accuracy. It is therefore better to utilize this method for verifying pressure drops in the expansion valve as measured through the evaporation and liquid temperatures of the refrigerant.

TABLE 4

Program for Condensation Pressure Optimization Controller
Two-stage Compression Freezer Unit VL/VH 2:1
Evaporation Temperature (to): −20° C.~−45° C.
Liquid Temperature of Refrigerant (tl): +1° C.~−20° C.

| to | tl ° C. | | | | | | | | | | |
|---|---|---|---|---|---|---|---|---|---|---|---|
| | −20 | −19 | −18 | −17 | −16 | −15 | −14 | −13 | −12 | −11 | −10 |
| −45 | 423.0 | 427.4 | 431.8 | 436.2 | 440.6 | 445.0 | 449.4 | 453.8 | 458.2 | 462.6 | 467.0 |
| −44 | 440.8 | 445.2 | 449.7 | 454.1 | 458.5 | 462.9 | 467.3 | 471.7 | 476.1 | 480.5 | 484.9 |
| −43 | 457.8 | 462.2 | 466.7 | 471.1 | 475.6 | 480.0 | 484.5 | 488.9 | 493.3 | 497.8 | 502.2 |
| −42 | 473.7 | 478.3 | 482.8 | 487.3 | 491.8 | 496.4 | 500.9 | 505.4 | 510.0 | 514.5 | 519.0 |
| −41 | 488.8 | 493.4 | 498.0 | 502.7 | 507.3 | 512.0 | 516.6 | 521.3 | 525.9 | 530.6 | 535.2 |
| −40 | | 507.6 | 512.4 | 517.2 | 522.0 | 526.8 | 531.6 | 536.5 | 541.3 | 546.1 | 550.9 |
| −39 | | | | 530.9 | 535.9 | 540.9 | 545.9 | 550.9 | 556.0 | 561.0 | 566.0 |
| −38 | | | | | | 554.3 | 559.5 | 564.8 | 570.0 | 575.2 | 580.5 |
| −37 | | | | | | | | 577.9 | 583.4 | 588.9 | 594.5 |
| −36 | | | | | | | | | 596.2 | 602.0 | 607.8 |
| −35 | | | | | | | | | | 614.5 | 620.6 |

TABLE 4-continued

Program for Condensation Pressure Optimization Controller
Two-stage Compression Freezer Unit VL/VH 2:1
Evaporation Temperature (to): −20° C.~−45° C.
Liquid Temperature of Refrigerant (tl): +1° C.~−20° C.

|     |   |   |   |   |   |   |   |   |   |   | 1 |
|-----|---|---|---|---|---|---|---|---|---|---|---|
| −34 |   |   |   |   |   |   |   |   |   |   | 632.9 |
| −33 |   |   |   |   |   |   |   |   |   |   |   |
| −32 |   |   |   |   |   |   |   |   |   |   |   |
| −31 |   |   |   |   |   |   |   |   |   |   |   |
| −30 |   |   |   |   |   |   |   |   |   |   |   |
| −29 |   |   |   |   |   |   |   |   |   |   |   |
| −28 |   |   |   |   |   |   |   |   |   |   |   |
| −27 |   |   |   |   |   |   |   |   |   |   |   |
| −26 |   |   |   |   |   |   |   |   |   |   |   |
| −25 |   |   |   |   |   |   |   |   |   |   |   |
| −24 |   |   |   |   |   |   |   |   |   |   |   |
| −23 |   |   |   |   |   |   |   |   |   |   |   |

| | | | | | tl ° C. | | | | | | |
|---|---|---|---|---|---|---|---|---|---|---|---|
| to | −9 | −8 | −7 | −6 | −5 | −4 | −3 | −2 | −1 | 0 | 1 |
| −45 | 471.3 | 475.7 | | | | | | | | | |
| −44 | 489.3 | 493.7 | 498.0 | | | | | | | | |
| −43 | 506.7 | 511.1 | 515.6 | 520.0 | | | | | | | |
| −42 | 523.6 | 528.1 | 532.6 | 537.1 | 541.7 | | | | | | |
| −41 | 539.9 | 544.6 | 549.2 | 553.9 | 558.5 | 563.2 | | | | | |
| −40 | 555.7 | 560.5 | 565.4 | 570.2 | 575.0 | 579.8 | 584.7 | | | | |
| −39 | 571.0 | 576.0 | 581.0 | 586.1 | 591.1 | 596.1 | 601.2 | 606.2 | | | |
| −38 | 585.8 | 591.0 | 596.3 | 601.5 | 606.8 | 612.1 | 617.4 | 622.6 | 627.9 | | |
| −37 | 600.0 | 605.5 | 611.1 | 616.6 | 622.1 | 627.7 | 633.2 | 638.8 | 644.4 | 649.9 | |
| −36 | 613.7 | 619.5 | 625.4 | 631.2 | 637.1 | 642.9 | 648.8 | 654.7 | 660.5 | 666.4 | 672.3 |
| −35 | 626.8 | 633.0 | 639.2 | 645.4 | 651.6 | 657.8 | 664.1 | 670.3 | 676.5 | 682.7 | 688.9 |
| −34 | 639.5 | 646.1 | 652.6 | 659.2 | 665.8 | 672.4 | 679.0 | 685.6 | 692.2 | 698.8 | 705.4 |
| −33 | 651.6 | 658.6 | 665.6 | 672.6 | 679.6 | 686.6 | 693.6 | 700.7 | 707.7 | 714.7 | 721.7 |
| −32 |  | 670.6 | 678.1 | 685.5 | 693.0 | 700.5 | 708.0 | 715.4 | 722.9 | 730.4 | 737.9 |
| −31 |  |  | 690.1 | 698.1 | 706.0 | 714.0 | 722.0 | 729.9 | 737.9 | 745.9 | 753.9 |
| −30 |  |  |  | 710.2 | 718.7 | 727.2 | 735.7 | 744.2 | 752.7 | 761.2 | 769.7 |
| −29 |  |  |  |  | 730.9 | 740.0 | 749.1 | 758.1 | 767.2 | 776.2 | 785.3 |
| −28 |  |  |  |  |  | 752.5 | 762.1 | 771.8 | 781.5 | 791.1 | 800.8 |
| −27 |  |  |  |  |  |  | 774.9 | 785.2 | 795.5 | 805.8 | 816.1 |
| −26 |  |  |  |  |  |  |  | 798.3 | 809.3 | 820.3 | 831.2 |
| −25 |  |  |  |  |  |  |  |  | 822.9 | 834.5 | 846.2 |
| −24 |  |  |  |  |  |  |  |  |  | 848.6 | 861.0 |
| −23 |  |  |  |  |  |  |  |  |  |  | 875.6 |

In addition, large unit coolers often have a long ⅝" tube coil with one circuit longer than 30 m, despite the fact that they are for cooling. Such unit coolers tend to suffer a significant amount of pressure loss, producing a large pressure differential between the coil inlet and outlet, resulting in the lower temperature equivalent to evaporation pressure at the outlet rather than the inlet. In other words, the suction pressure of the freezer unit is low, and the freezing capacity is smaller. If the coil inlet temperature is used as the evaporation temperature, the real refrigerant evaporation temperature is lower than that, resulting in a compression pressure higher than the limit value; hence the control accuracy will be poor. When such a cooler unit is to be used, a pressure sensor should be installed at the suction pipe of the cooler outlet so that the suction pressure equivalent temperature is taken as the evaporation temperature.

If condensation pressure decreases so much that no proper pressure drops are obtainable, then the refrigerant evaporation temperature falls, which makes TD, the difference between the room and refrigerant evaporation temperatures, deviate from the design values. The condensation pressure may be controlled to fall in the proper range by approximating it to the design TD value prescribed for different evaporation temperatures. When the room temperature is close to the design value, for instance, if superheat is escalating despite the expansion valve 19 being almost fully open, the condensation pressure may be controlled to increase.

The refrigerant flow and its basic behavior are described as follows: the over-heated refrigerant gas exhausted from the compressor by air condenser 8 releases heat to the outside air; the gas is condensed to a liquid refrigerant, which is deposited into refrigerant receiver 2; the refrigerant from the refrigerant receiver 2 is sent to intermediate cooler 3 that chills the refrigerant; the cooled refrigerant is mixed in with the discharged gas from the low-stage compressor in the freezer unit and sucked into the high-stage compressor; the refrigerant thus cooled goes through expansion valve 19 and distributor 15 in an over-refrigerated state with its pressure dropping down to evaporation pressure; the refrigerant in a two-phase flow at its evaporation temperature flows through inside the coil of unit cooler 13, and at the same time, the air on the load side continuously passes the outside of the coil; the air is cooled because the refrigerant temperature is lower than the air temperature; and, the cooled air is sent out by fan 14 into the freezer room for cooling. The refrigerant gasified in the coil exits from suction header 18 and is suctioned into the low stage side of the two-stage compression freezer unit 1 via suction piping; it is then compressed again.

In this embodiment, appropriate pressure drop values are calculated by referencing the liquid refrigerant temperature measured by liquid temperature sensor 24 as well as the refrigerant evaporation temperature measured by evaporation temperature sensor 25, or the refrigerant temperature at the inlet of the evaporator coil connected to the tubing 17 of distributor 15. This calculation may be performed in rather a simple manner by replacing the two variables, the evaporation temperature and liquid temperature of the refrigerant, with a two-variable polynomial equation and by combining the minimum pressure drop and the smallest pressure drop under an increased evaporation temperature in a quadratic expression.

The result of this calculation is compared with the measured value of pressure sensor 28, which is located before the expansion valve 19. Condensation pressure optimization controller 23 generates a control signal to inverter 12, instructing it either to step up or step down the condensation temperature or pressure of the refrigerant in the air condenser 8. The motor 10 of the air condenser 8 is thereby controlled to regulate the rotation of fan 9, adjusting the refrigerant condensation performance of the air condenser 8. The condensation pressure optimization controller 23 controls the inverter 12 in such a manner that the actual value measured by pressure sensor 28 approximates the calculation result, which is the optimum pressure drop value of the refrigerant.

Figure 5:
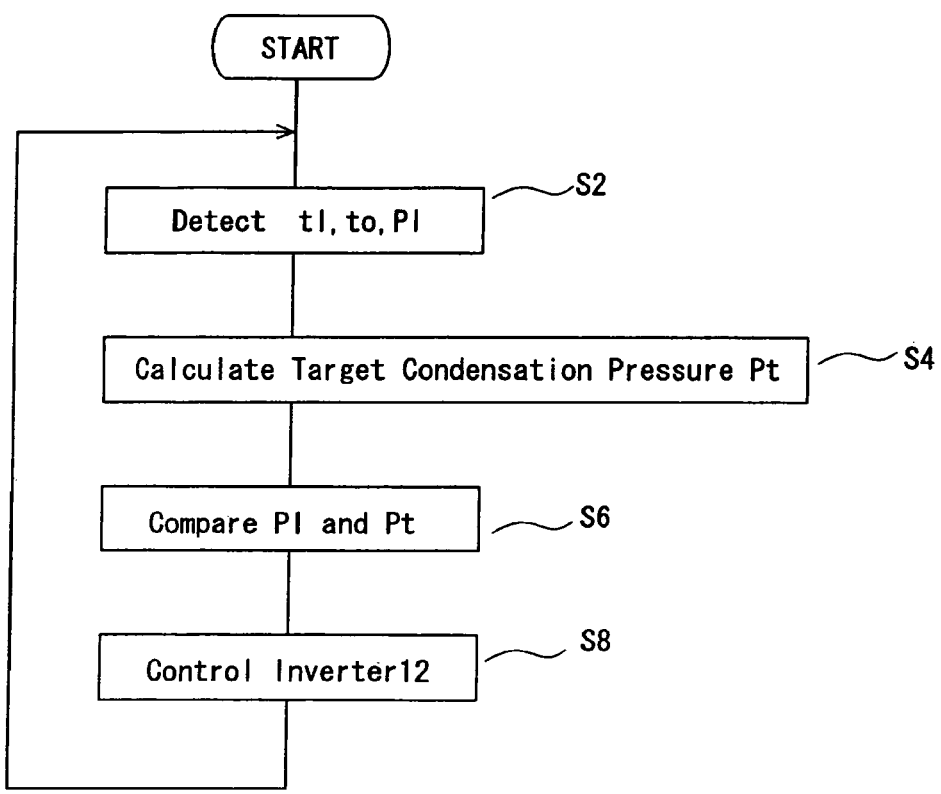
FIG. 5 is a flow chart for controlling the condensation pressure.

FIG. 5 shows a flow chart for controlling the condensation pressure. Referring to FIG. 5, at step S2, the liquid temperature sensor 24 detects temperature (tl) of liquid refrigerant, the evaporation temperature sensor 25 detects evaporation temperature (to), and the pressure sensor 28 detects refrigerant pressure Pl before the expansion valve 19. At step S4, the target condensation pressure Pt is found based on the map as shown in Table 4 according to the temperature (tl) of liquid refrigerant and the evaporation temperature (to). Note that the target condensation pressure Pt may be calculated according to the following equation:

$$\text{Target Pressure} = 1125.08 + (9.07965*X) + (-0.101693*X*X) + (40.8041*Y) + (1.60973*X*Y) + (0.0177658*X*X*Y) + (-0.0547654*Y*Y) + (-0.0031858*X*Y*Y) + (-0.000044704*X*X*Y*Y),$$

where X=Evaporation Temperature, and Y=Liquid Temperature of Refrigerant

At step S6, the refrigerant pressure Pl detected by the pressure sensor 28 is compared with the target condensation pressure Pt. Then, at step S8, the controller 23 controls the inverter 12 such that the refrigerant pressure Pl detected by the pressure sensor 28 becomes equal to the target condensation pressure Pt. At step S8, the controller 23 may control the inverter 12 such that the refrigerant pressure Pl detected by the pressure sensor 28 becomes higher, for example, by 20 kPa, than the target condensation pressure Pt.

In the operation where the evaporation temperature is the designed evaporation temperature or lower, the condensation pressure optimization controller 23 performs a control function as a safety mechanism as follows: refrigerant sensor 26 measures the refrigerant temperature at the inlet of distributor 15, while evaporation temperature sensor 25 measures the refrigerant saturation temperature at the outlet of distributor 15; the condensation pressure optimization controller 23 converts these measured temperatures to respective equivalent pressures and determines the pressure drop of the refrigerant in the distributor 15; this measured pressure drop is compared to the benchmark pressure drop; if below the benchmark, then the rotation of fan 9 in the air condenser 8 is controlled by inverter 12; and, the refrigerant pressure drop in distributor 15 is thus controlled to approximate the benchmark value, which is the optimum value.

As mentioned above, the refrigerant pressure to be measured by pressure sensor 28 located before expansion valve 19 is used as the reference for controlling the condensation pressure in the air condenser 8. Thanks to this configuration, even if pressure losses become significant due to performance deterioration or choking of dryer 4, air condenser 8 will be operated at a higher pressure in order to compensate for the loss of the condensation pressure on the refrigerant side because it is a condensation pressure control based on the liquid refrigerant pressure on the upstream side of expansion valve 19. If, in contrast, the condenser is placed upstream of the unit cooler, then the pressure produced by the height of the liquid column will be added to the liquid refrigerant upstream of the expansion valve, the condensation pressure optimization controller should add the correction value equivalent to the liquid column height so that the condensation pressure includes the pressure equivalent to the liquid column height.

As shown thus far, this embodiment will operate by actively lowering the condensation temperature without ever falling below the pressure drop value required for the refrigerant to reach the evaporation temperature. For instance, if a refrigerator described in the aforementioned example is operated in the city of Sapporo, annual average freezing performance will increase by roughly 20% since lower liquid refrigerant temperatures increase the specific enthalpy differentials in comparison to the operation of a typical freezing facility that limits the condensation temperature of refrigerant at around +25° C. regardless of the outside temperature. This allows reductions in operating hours and improvements in volumetric efficiency of the freezer unit, qu, and the power consumption can be reduced by up to approximately 30% through decreases in the pump power by lower compression ratios. Thus this embodiment produces a significant savings of 40% or more in power consumption per year by actively lowering the refrigerant condensation pressure.

The optimized operation method for refrigeration apparatus of the present embodiment in which the condensation pressure is determined based on the pressure drop in order to reach the evaporation temperature has an extremely high precision of distribution in comparison to that of the embodiment example 2. For this reason, the temperature difference (TD) between the room and evaporation temperatures of the refrigerant is also between 3° C. and 1.5° C. This allows the operation to occur through convection heat transfer rather than through heat transfer by boiling. Therefore, the method not only suppresses the performance decline due to frost formation, but also reduces the drying force (sublimation phenomenon), preventing products from drying out. Products can be frozen and preserved in extremely good condition.

In addition, the present embodiment of refrigeration apparatus also offers an advantage that any possible causes for abnormalities can be promptly eliminated since the upstream liquid pressure of the refrigerant from expansion valve 19 is continuously monitored by pressure sensor 28, which means the condensation temperature of the refrigerant in air condenser 8 is also being monitored.

Although the fans 9 are controlled to adjust the condensation pressure in the above embodiments, an adjustable valve 40 which is provided at an output side of the refrigerant of the condensing unit 8 may be controlled.

Moreover, this invention is in no way limited to the above-mentioned embodiments. Many variations are possible within the scope of this invention; including the following examples:

(1) Although, in the aforementioned embodiment, this invention is applied to walk-in freezers equipped with a two-stage compression cycle refrigerating unit, it is equally applicable to other types of refrigeration and refrigeration apparatus in general.

(2) Although the nozzle type refrigerant distributor is used in the refrigeration apparatus for the aforementioned embodiment, this invention is equally applicable to such equipment with a venturi-type refrigerant distributor if the latter is chosen due to size considerations.

(3) Although a coil air-cooling method is used as the condensation means in the refrigeration apparatus of the aforementioned embodiment, this invention is also applicable to water cooling or evaporation cooling by controlling the water volume or the fan rotation speed respectively. One variation of the embodiment is to control a flow rate regulator valve by the condensation pressure optimization controller so that the regulator controls the condensation pressure by keeping liquid refrigerant in the condenser of the embodiment and varying the size of the cooling condensation area.

(4) In the case of flooding-type refrigeration apparatus, condensation pressure can be optimally controlled simply by the degree of pressure drop in the refrigerant liquid pipe and the expansion valve.

(5) Since it is possible to control the difference between the evaporation temperature and the condensation pressure at about 250 kPa even in freezing and refrigeration equipment to be operated at an evaporation temperature in the vicinity of 0° C. such as chillers, large power savings can be achieved.

(6) In the embodiments, if a gap arises between the design and actual temperatures of liquid refrigerant, compensation may be made for the design value of the liquid refrigerant temperature by obtaining the total pressure drop in the distributor so that the temperature difference is controlled to remain on or above the minimum value required for the distributor's operation.

(7) In the case of refrigeration apparatus employing single-stage compressors and operating at a comparatively higher temperature where the evaporation temperature of the refrigerant is −30° C. or higher, the optimum control of condensation pressure can be obtained simply if the amount of overcooling is taken into consideration at a certain ratio from the condensation temperature.

(8) Although R-22 and R-404 are used in the embodiment, other refrigerant, for example, R-717, NH3, R-290, propane, R-600 or butane may be used.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A refrigeration apparatus comprising:
a condensing unit;
a flow distributor provided within a unit cooler;
an expansion valve upstream of said flow distributor;
an evaporator connected to said condensing unit via said flow distributor;
a pressure detector configured to detect condensation pressure of the refrigerant, said pressure detector being located upstream of said expansion valve and downstream of said condensing unit;
a refrigerant liquid receiver provided downstream of said condensing unit and upstream of said pressure detector;
a liquid temperature sensor configured to detect a temperature of the refrigerant at an entrance of the expansion valve;
an evaporation temperature sensor configured to detect a temperature of the refrigerant at an exit of the flow distributor;
a calculator configured to calculate a target condensation pressure of the refrigerant necessary for the refrigerant to be an evaporation temperature in the evaporator; and
a controller configured to control said condensing unit so that the condensation pressure of the refrigerant becomes equal to or more than the target condensation pressure,
wherein said condensing unit includes an adjustable valve at an output side of said condensing unit to control the flow of the refrigerant, wherein said adjustable valve is provided downstream of said condensing unit and upstream of said expansion valve, and wherein said controller is configured to control the adjustable valve, and
wherein the controller is configured to calculate an amount of pressure drop in the expansion valve using the temperature detected by the liquid temperature sensor at the entrance of the expansion valve, and is configured to calculate an amount of pressure drop in the flow distributor using the temperature detected by the evaporation temperature sensor at the exit of the flow distributor, and is configured to control the condensing unit based on the calculated amount of pressure drop in the expansion valve and the calculated amount of pressure drop in the flow distributor.

2. The refrigeration apparatus according to claim 1, wherein said condensing unit includes a fan and wherein said controller is configured to control the fan.

3. The refrigeration apparatus according to claim 1, wherein said pressure detector is configured to detect condensation pressure in a vicinity of and upstream of the expansion valve.

4. The refrigeration apparatus according to claim 1, wherein said calculator is configured to calculate the target condensation pressure based on the detected temperature of the refrigerant at the entrance of the expansion valve and the detected temperature of the refrigerant at the exit of the flow distributor.

5. The refrigeration apparatus according to claim 1, wherein said controller is configured to control said condensing unit to increase the condensation pressure when a degree of superheat of the refrigerant gradually increases even though the expansion valve is fully open.

6. The refrigeration apparatus according to claim 1, further comprising:
a dryer provided downstream of the refrigerant liquid receiver and upstream of the pressure detector; and
an intermediate cooler provided downstream of the dryer and upstream of the pressure detector.

7. The refrigeration apparatus according to claim 1, wherein said adjustable valve is provided upstream of said refrigerant liquid receiver.

8. A refrigeration apparatus comprising:
a condensing unit;
a flow distributor;
an expansion valve;
an evaporator connected to said condensing unit via said flow distributor;
a pressure detector configured to detect condensation pressure of the refrigerant, said pressure detector being located upstream of said expansion valve and downstream of said condensing unit;
a refrigerant liquid receiver provided downstream of said condensing unit and upstream of said pressure detector;
a calculator configured to calculate a target condensation pressure of the refrigerant necessary for the refrigerant to be an evaporation temperature in the evaporator;

a controller configured to control said condensing unit so that the condensation pressure of the refrigerant becomes equal to or more than the target condensation pressure;

a compartment temperature sensor configured to detect a compartment temperature in a compartment of the refrigeration apparatus; and an evaporation temperature sensor configured to detect an evaporation temperature, wherein said controller is configured to control said condensing unit according to a change in a difference between the compartment temperature and the evaporation temperature, and wherein said condensing unit includes an adjustable valve at an output side of said condensing unit to control the flow of the refrigerant, wherein said adjustable valve is provided downstream of said condensing unit and upstream of said expansion valve, and wherein said controller is configured to control the adjustable valve.

9. The refrigeration apparatus according to claim 8, wherein said difference between the compartment temperature and the evaporation temperature is at least 1.5° C. and at most 3° C.

10. A refrigeration apparatus comprising:
a condensing unit;
a flow distributor provided within a unit cooler;
an expansion valve upstream of said flow distributor;
an evaporator connected to said condensing unit via said flow distributor;
pressure detecting means for detecting condensation pressure of the refrigerant, said pressure detecting means being located upstream of said expansion valve and downstream of said condensing unit;
a refrigerant liquid receiver provided downstream of said condensing unit and upstream of said pressure detecting means;
a liquid temperature sensing means for detecting a temperature of the refrigerant at an entrance of the expansion valve;
an evaporation temperature sensing means for detecting a temperature of the refrigerant at an exit of the flow distributor;
calculation means for calculating a target condensation pressure of refrigerant necessary for the refrigerant to be an evaporation temperature in the evaporator; and
controlling means for controlling said condensing unit so that the condensation pressure of the refrigerant becomes equal to or more than the target condensation pressure,
wherein said condensing unit includes an adjustable valve at an output side of said condensing unit to control the flow of the refrigerant, wherein said adjustable valve is provided downstream of said condensing unit and upstream of said expansion valve, and wherein said controlling means is configured to control the adjustable valve, and
wherein the controlling means is configured to calculate an amount of pressure drop in the expansion valve using the temperature detected by the liquid temperature sensing means at the entrance of the expansion valve, and is configured to calculate an amount of pressure drop in the flow distributor using the temperature detected by the evaporation temperature sensing means at the exit of the flow distributor, and is configured to control the condensing unit based on the calculated amount of pressure drop in the expansion valve and the calculated amount of pressure drop in the flow distributor.

11. The refrigeration apparatus according to claim 10, further comprising:
a dryer provided downstream of the refrigerant liquid receiver and upstream of the pressure detecting means; and
an intermediate cooler provided downstream of the dryer and upstream of the pressure detecting means.

12. The refrigeration apparatus according to claim 10, wherein said adjustable valve is provided upstream of said refrigerant liquid receiver.

13. A method for controlling a refrigeration apparatus, the method comprising:
detecting condensation pressure of refrigerant at a location upstream of an expansion valve, downstream of a condensing unit, and downstream of a refrigerant liquid receiver provided downstream of the condensing unit;
detecting a temperature of the refrigerant at an entrance of the expansion valve;
detecting a temperature of the refrigerant at an exit of the flow distributor;
calculating a target condensation pressure of the refrigerant necessary for the refrigerant to be an evaporation temperature in the evaporator; and
controlling the condensing unit connected to the evaporator via a flow distributor provided within a unit cooler so that the condensation pressure of the refrigerant becomes equal to or more than the target condensation pressure,
wherein said expansion valve is upstream of said flow distributor, and
wherein said condensing unit includes an adjustable valve at an output side of said condensing unit to control the flow of the refrigerant, wherein said adjustable valve is provided downstream of said condensing unit and upstream of said expansion valve, and wherein a controller is configured to control the adjustable valve, and
wherein the method further comprises calculating an amount of pressure drop in the expansion valve using the temperature detected at the entrance of the expansion valve, and calculating an amount of pressure drop in the flow distributor using the temperature detected at the exit of the flow distributor, and controlling the condensing unit based on the calculated amount of pressure drop in the expansion valve and the calculated amount of pressure drop in the flow distributor.

14. The method according to claim 13, wherein:
a dryer is provided downstream of the refrigerant liquid receiver and upstream of a location where the condensation pressure of the refrigerant is detected; and
an intermediate cooler is provided downstream of the dryer and upstream of the location where the condensation pressure of the refrigerant is detected.

15. The method according to claim 13, wherein said adjustable valve is provided upstream of said refrigerant liquid receiver.

16. A non-transitory computer readable medium for storing a computer program, which when executed, controls a computer to perform the steps of:
detecting condensation pressure of refrigerant at a location upstream of an expansion valve, downstream of a condensing unit, and downstream of a refrigerant liquid receiver provided downstream of the condensing unit;
detecting a temperature of the refrigerant at an entrance of the expansion valve;
detecting a temperature of the refrigerant at an exit of the flow distributor;

calculating a target condensation pressure of the refrigerant necessary for the refrigerant to be an evaporation temperature in the evaporator; and controlling the condensing unit connected to the evaporator via a flow distributor provided within a unit cooler so that the condensation pressure of the refrigerant becomes equal to or more than the target condensation pressure, wherein said expansion valve is upstream of said flow distributor, and wherein said condensing unit includes an adjustable valve at an output side of said condensing unit to control the flow of the refrigerant, wherein said adjustable valve is provided downstream of said condensing unit and upstream of said expansion valve, and wherein a controller is configured to control the adjustable valve, and wherein the controller is configured to calculate an amount of pressure drop in the expansion valve using the temperature detected by the liquid temperature sensor at the entrance of the expansion valve, and is configured to calculate an amount of pressure drop in the flow distributor using the temperature detected by the evaporation temperature sensor at the exit of the flow distributor, and is configured to control the condensing unit based on the calculated amount of pressure drop in the expansion valve and the calculated amount of pressure drop in the flow distributor.

17. The non-transitory computer readable medium for storing a computer program, which when executed, controls a computer to perform the steps according to claim 16, wherein:
a dryer is provided downstream of the refrigerant liquid receiver and upstream of a location where the condensation pressure of the refrigerant is detected; and
an intermediate cooler is provided downstream of the dryer and upstream of the location where the condensation pressure of the refrigerant is detected.

18. The non-transitory computer readable medium for storing a computer program, which when executed, controls a computer to perform the steps according to claim 16, wherein said adjustable valve is provided upstream of said refrigerant liquid receiver.

19. A refrigeration apparatus comprising:
a condensing unit;
a flow distributor;
an expansion valve;
an evaporator connected to said condensing unit via said flow distributor;
a pressure detector configured to detect condensation pressure of the refrigerant, said pressure detector being located upstream of said expansion valve and downstream of said condensing unit;
a refrigerant liquid receiver provided downstream of said condensing unit and upstream of said pressure detector;
a calculator configured to calculate a target condensation pressure of the refrigerant necessary for the refrigerant to be an evaporation temperature in the evaporator;
a controller configured to control said condensing unit so that the condensation pressure of the refrigerant becomes equal to or more than the target condensation pressure;
a first temperature detector configured to detect a first temperature of the refrigerant at an inlet of the expansion valve; and
a second temperature detector configured to detect a second temperature of the refrigerant at an outlet of the flow distributor;

wherein said controller is configured to control the condensing unit based on calculation of a pressure drop in an expansion device including the expansion valve and the flow distributor, the pressure drop being calculated by comparing the first temperature of the refrigerant detected by the first temperature detector and the second temperature of the refrigerant detected by the second temperature detector, wherein said calculator is configured to calculate a minimum necessary pressure drop of the flow distributor to allow the second temperature to attain an evaporation temperature in the evaporation device, and to calculate a minimum pressure drop of the flow distributor in an increased evaporation temperature of the refrigerant, wherein said calculator calculates the target condensation pressure from the minimum necessary pressure drop and the minimum pressure drop of the flow distributor in an increased evaporation temperature, wherein said controller is configured to control a compression temperature or a compression pressure of the condensing unit to provide the target condensation pressure, and wherein said condensing unit includes an adjustable valve at an output side of said condensing unit to control the flow of the refrigerant, wherein said adjustable valve is provided downstream of said condensing unit and upstream of said expansion valve, and wherein said controller is configured to control the adjustable valve.

20. A refrigeration apparatus comprising:
a condensing unit;
a flow distributor;
an expansion valve;
an evaporator connected to said condensing unit via said flow distributor;
pressure detecting means for detecting condensation pressure of the refrigerant, said pressure detecting means being located upstream of said expansion valve and downstream of said condensing unit;
a refrigerant liquid receiver provided downstream of said condensing unit and upstream of said pressure detecting means;
calculation means for calculating a target condensation pressure of refrigerant necessary for the refrigerant to be an evaporation temperature in the evaporator;
controlling means for controlling said condensing unit so that the condensation pressure of the refrigerant becomes equal to or more than the target condensation pressure;
a first temperature detector configured to detect a first temperature of the refrigerant at an inlet of the expansion valve; and
a second temperature detector configured to detect a second temperature of the refrigerant at an outlet of the flow distributor;

wherein said controlling means is configured to control the condensing unit based on calculation of a pressure drop in an expansion device including the expansion valve and the flow distributor, the pressure drop being calculated by comparing the first temperature of the refrigerant detected by the first temperature detector and the second temperature of the refrigerant detected by the second temperature detector, wherein said calculation means is configured to calculate a minimum necessary pressure drop of the flow distributor to allow the second temperature to attain an evaporation temperature in the evaporation device, and to calculate a minimum pressure drop of the flow distributor in an increased evaporation temperature of the refrigerant, wherein said calculation means calculates the target condensation pressure from the minimum necessary pressure drop and the minimum pressure drop of the flow distributor in an increased evaporation temperature, wherein said controlling means is configured to control a compression temperature or a compression pressure of the condensing unit to provide the target condensation pressure, and wherein said condensing unit includes an adjustable valve at an output side of said condensing unit to control the flow of the refrigerant, wherein said adjustable valve is provided downstream of said condensing unit and upstream of said expansion valve, and wherein said controlling means is configured to control the adjustable valve.

21. A method for controlling a refrigeration apparatus, the method comprising:

detecting condensation pressure of refrigerant at a location upstream of an expansion valve, downstream of a condensing unit, and downstream of a refrigerant liquid receiver provided downstream of the condensing unit;

calculating a target condensation pressure of the refrigerant necessary for the refrigerant to be an evaporation temperature in the evaporator;

controlling the condensing unit connected to the evaporator via a flow distributor so that the condensation pressure of the refrigerant becomes equal to or more than the target condensation pressure;

detecting a first temperature of the refrigerant at an inlet of the expansion valve; and detecting a second temperature of the refrigerant at an outlet of the flow distributor;

wherein the condensing unit is controlled based on calculation of a pressure drop in an expansion device including the expansion valve and the flow distributor, the pressure drop being calculated by comparing the first temperature of the refrigerant detected by the first temperature detector and the second temperature of the refrigerant detected by the second temperature detector, wherein the target condensation pressure is calculated from a minimum necessary pressure drop and a minimum pressure drop of the flow distributor in an increased evaporation temperature where the minimum necessary pressure drop of the flow distributor is calculated to allow the second temperature to attain an evaporation temperature in the evaporation device, and the minimum pressure drop of the flow distributor is calculated in an increased evaporation temperature of the refrigerant, wherein the condensing unit is controlled to provide the target condensation pressure by controlling a compression temperature or a compression pressure of the condensing unit, and wherein said condensing unit includes an adjustable valve at an output side of said condensing unit to control the flow of the refrigerant, wherein said adjustable valve is provided downstream of said condensing unit and upstream of said expansion valve, and wherein a controller is configured to control the adjustable valve.

22. A non-transitory computer readable medium for storing a computer program, which when executed, controls a computer to perform the steps of:

detecting condensation pressure of refrigerant at a location upstream of an expansion valve, downstream of a condensing unit, and downstream of a refrigerant liquid receiver provided downstream of the condensing unit;

calculating a target condensation pressure of the refrigerant necessary for the refrigerant to be an evaporation temperature in the evaporator;

controlling the condensing unit connected to the evaporator via a flow distributor so that the condensation pressure of the refrigerant becomes equal to or more than the target condensation pressure;

detecting a first temperature of the refrigerant at an inlet of the expansion valve; and detecting a second temperature of the refrigerant at an outlet of the flow distributor;

wherein the condensing unit is controlled based on calculation of a pressure drop in an expansion device including the expansion valve and the flow distributor, the pressure drop being calculated by comparing the first temperature of the refrigerant detected by the first temperature detector and the second temperature of the refrigerant detected by the second temperature detector, wherein the target condensation pressure is calculated from a minimum necessary pressure drop and a minimum pressure drop of the flow distributor in an increased evaporation temperature where the minimum necessary pressure drop of the flow distributor is calculated to allow the second temperature to attain an evaporation temperature in the evaporation device, and the minimum pressure drop of the flow distributor is calculated in an increased evaporation temperature of the refrigerant, wherein the condensing unit is controlled to provide the target condensation pressure by controlling a compression temperature or a compression pressure of the condensing unit, and wherein said condensing unit includes an adjustable valve at an output side of said condensing unit to control the flow of the refrigerant, wherein said adjustable valve is provided downstream of said condensing unit and upstream of said expansion valve, and wherein a controller is configured to control the adjustable valve.

* * * * *